United States Patent [19]
Trexel

[11] 3,988,160
[45] Oct. 26, 1976

[54] WATER-BASED FLEMISHING COMPOSITION

[76] Inventor: James J. Trexel, 2530 Blackwood Road, Wilmington, Del. 19810

[22] Filed: Dec. 24, 1974

[21] Appl. No.: 536,100

[52] U.S. Cl. ............................ 106/1; 106/189; 106/193 R; 106/193 M; 106/197 C; 106/203; 106/204; 260/29.6 BE; 260/17 R; 260/33.4 R; 260/42.22
[51] Int. Cl.² .................. C08L 1/08; C23C 3/00; B05D 5/00
[58] Field of Search ....... 106/1, 189, 193 R, 193 M, 106/197 C, 203, 204; 427/4; 428/21, 22; 260/13, 29.6 BE, 17 R, 42.22, 33.4 R

[56] References Cited
UNITED STATES PATENTS

| | | | |
|---|---|---|---|
| 2,695,275 | 11/1954 | Gray | 106/193 M |
| 2,759,446 | 8/1956 | Ewing | 106/193 M |
| 3,043,747 | 7/1962 | Long | 106/197 R |
| 3,470,120 | 9/1969 | Sasai | 260/13 |
| 3,479,187 | 10/1969 | Kane | 106/204 |
| 3,649,586 | 3/1972 | Trexel | 106/1 |
| R24,863 | 8/1960 | Roger | 106/193 M |

*Primary Examiner*—Lorenzo B. Hayes

[57] ABSTRACT

Herein are disclosed improved articles of manufacture, a method and composition for making same, involving the imparting of a pleasing "flemish" appearance to a solid substrate of natural or artificial articles having preferably a slightly rough surface including artificial flowers, fruit, vegetables, dried plants and the like by applying to the surface thereof a formulation comprising a powdered metal dispersed in a solution of a water-soluble cellulose polymer binder in solvent. Application to live plants and flowers and cut flowers and plants is feasible. This can be done with no detrimental effects on live plants.

2 Claims, 1 Drawing Figure

WATER-BASED FLEMISHING METHOD AND ARTICLES

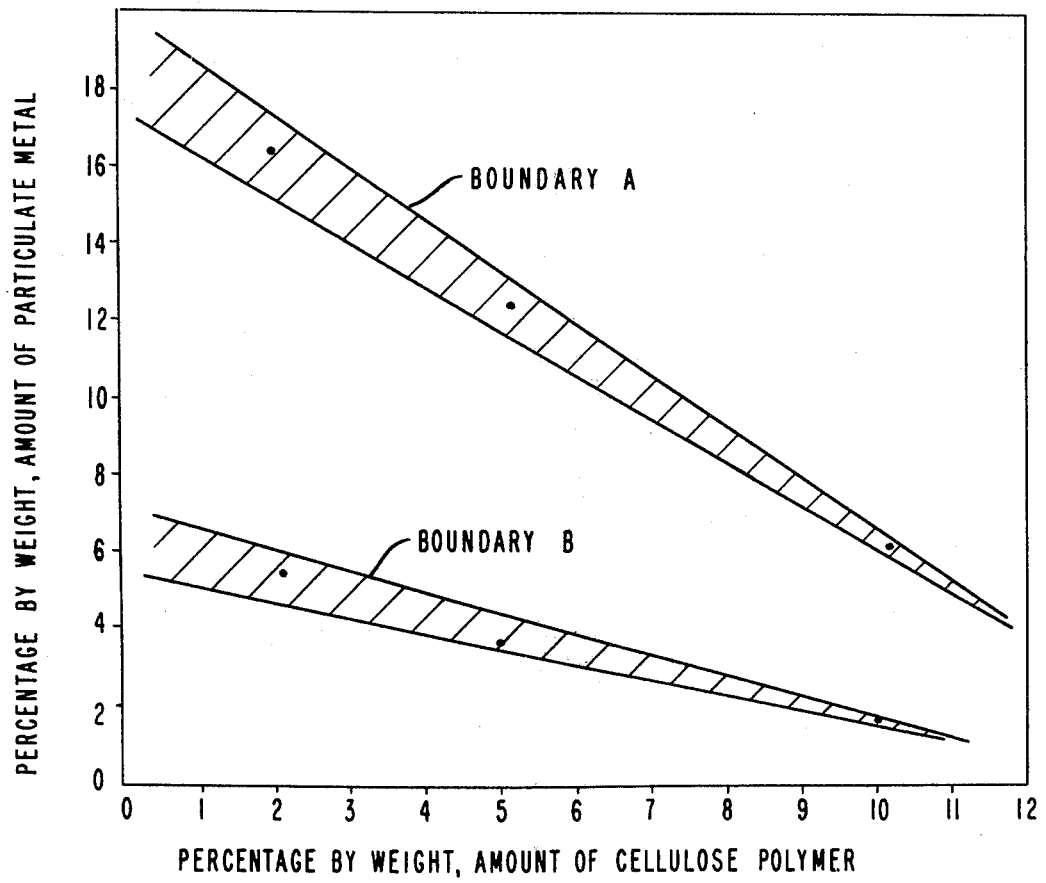

WATER-BASED FLEMISHING COMPOSITION

BACKGROUND OF THE INVENTION a. Field of the Invention

This invention relates to a composition and process for imparting an "antiqued" or flemished appearance on decorative articles such as artificial flowers, fruits, vegetables, dried plants, cut and living plants and the like. It also relates to the resulting coated articles.

b. Description of the Prior Art

It is known in the art that an attractive aged or antiqued appearance, known as flemish, may be applied as a decorative finish to articles having a surface with some uneven projections such as artificial flowers, fruits and vegetables. The processes for imparting the finish are tedious, requiring many dipping steps and a drying step wherein the article which is coated is kept in an inverted position.

Decorative articles made from plastic materials made of waxes and hydrocarbon polymers such as polystyrene, polyvinyl chloride and the like, and other substances such as glass and porcelain, in the form of fruits, flowers, vegetables, vases, trays, frames, centerpieces, and the like, are commonplace. However, the appearance of such articles as conventionally made and sold quite often leaves much to be desired. One common defect is that such articles frequently look overly "new", and hence artificial. The appearance of these articles can be improved by imparting thereto an antiqued or flemished appearance. Accordingly, a principal object of this invention is to provide a novel method for giving an antiqued or flemished appearance having an aged or antique appearance to solid substrate surfaces. A further object of this invention is to provide novel and improved articles of manufacture having this flemish or antique appearance as decorations such as artificial flowers, fruits and vegetables, vases, trays, frames and the like, which are improved in appearance. Yet another object of this invention is to provide a simple process useful for improving the appearance of artificial flowers, fruits, vegetables and the like, as aforesaid by imparting thereto an antiqued or flemished appearance. Still another object of this invention is to provide a water-based composition which is useful to impart the flemish or antique appearance to substrates herein described.

SUMMARY OF THE INVENTION

The invention is directed to a method for imparting an antiqued appearance to a solid substrate surface which comprises:

a. applying to the surface of the substrate and allowing to dry a dispersion which comprises:
1. about 0.0 to 15% by weight of a water-soluble cellulose polymer selected from the group of sodium carboxymethyl cellulose, carboxymethyl hydroxyethyl cellulose, hydroxyethyl cellulose and hydroxypropyl cellulose; and polyvinyl alcohol, or mixtures thereof,
2. about 0.1 to 16% by weight of particulate metal,
3. 0 to about 10% by weight of dye or pigment, and
4. about 59 to 99.8% by weight of water, polar solvents or water-solvent blends;

b. the composition of the dispersion and the finished articles are claimed.

The dispersions of this invention useful for coating substrates with a flemish-like antique finish comprise:

a. about 0.1 to 15% by weight of a cellulose polymer as a binder,
b. about 0.1 to 16% by weight of a particulate powdered metal,
c. 0 to about 10% by weight of a coloring agent comprising a dye or pigment, and
d. about 59 to 99.8% by weight of water, or polar solvents or a mixture with polar organic solvents thereof; with the provisos that dispersions containing up to 2% by weight of polymer contain up to 16% by weight of metal; dispersions containing 2 to 5% by weight polymer contain up to 15% by weight metal; dispersions containing 5 to 8% by weight polymer contain up to 12% by weight metal; dispersions containing 8 to 11% by weight polymer contain up to 8% by weight metal; dispersions containing 11 to 15% by weight polymer contain up to 6% by weight metal; and with the further proviso that when the metal is aluminum the per cent by weight of aluminum is one-third of said amounts of metal.

BRIEF DESCRIPTION OF THE DRAWING

The single FIGURE of the drawing is a graph of the interrelationship of amount of cellulose polymer and particulate metal making up the composition of this invention.

DESCRIPTION OF PREFERRED EMBODIMENTS

With reference to the drawing, Boundary A of the graph shows the relationship of dispersions containing metal powders other than aluminum. Boundary B shows the relationship of dispersions containing aluminum. The remainder of the material making up the dispersion is a dye and/or a pigment and solvent (preferably water). It has been found that the appearance of articles of manufacture having a surface with uneven projections can be substantially improved by applying thereto the composition of matter of this invention. The improvement in appearance obtained consists of flemish or antique appearance being imparted to the articles.

By flemish or antique appearance, it is means the effect pleasing to the human eye achieved by the creation of a flossy surface having decorative metallized portions predominantly at the edges of the object and on ridges, high or raised portions, or on irregular or rough areas of said surface.

An effect somewhat similar to that obtained by my invention can be achieved by a multiple process wherein the object is repeatedly and alternately dipped in a solution of a resinous material in an organic solvent containing a particulate metal and then allowing the object so treated to drip in an inverted position. However, the articles of manufacture of this invention are unexpectedly improved and more pleasing in appearance compared to the objects produced by the multiple dipping process because the transition from the metallized coated areas to the nonmetallized coated areas is gradual. The multiple dipping process produces articles having very little if any graduation between the metallized areas and the nonmetallized areas.

The process of this invention for coating a substrate to impart a flemish appearance comprises applying by painting, dipping, spraying or by any known coating method to the substrate the novel dispersion described above of a particulate powdered metal dispersed in a solution of cellulose polymer dissolved in water (softened or distilled water preferred).

Preferably, the dispersion is applied to a substrate having a surface having smooth areas interspersed with small ridges, rough areas or high spots.

After application of the dispersion of this invention, the water is allowed to dry or evaporate from the coating on the article of manufacture in any position including an upright position by allowing the article to stand until dry. The polymer portion of the dispersion slowly hardens as the water evaporates. The particulate metal migrates to the edges of the article while the dispersion is fluid; therefore, the antiqued effect is not a result of the evaporation of the solvent. The result obtained on drying is a glossy clear or translucent coating of the cellulose binder on the surface of the coated article with the particulate metal localized at the edges and at any ridges or high spots or rough areas on the surface of the article.

It is believed that the gradual and predominate localization of the metal component of the dispersion to edges, raised and irregular areas, ridges and rough spots or on otherwise predominately smooth substrate is a result of the use of the proper ratio of the particulate metal to the polymer concentration of the dispersion. When dispersions commonly called paints, containing higher ratios, i.e., outside of claims, of particulate metal to polymer are used, the localization effect is not obtained. Use of such compositions on a substrate results in the entire surface of the substrate being coated with the particulate metal and the pleasing flemish or antique effect produced by my compositions is not obtained.

Particulate powdered metals found suitable for use in practicing the present invention include particulate powdered gold bronze, aluminum, copper and mixtures and alloys thereof with each other and the like. The metal must be a powder, e.g., in a finely divided particulate form. Any grade from coarse (70% passing through a 325 mesh) to super fine (100% passing through a 325 mesh) can be used. Suitable metal powders are available commercially and are conveniently used. They include, for example, products such as Aluminum and Gold Bronze Powders, available from Alcan Metal Powders, Incorporated of Elizabeth, NJ.

The preferred particulate metal has a bulking value of 0.048 gal./lb. for aluminum and 0.015 gal./lb. for gold bronze or copper.

Binders suitable for use in practicing the present invention include, for example, the various water-soluble cellulose products available commercially from Hercules Incorporated, or Wilmington, DE. These products include CMC sodium carboxymethyl cellulose, CMHEC sodium salt of carboxymethyl hydroxyethyl cellulose, Natrosol 250 hydroxyethyl cellulose and Klucel hydroxypropyl cellulose. Natural occurring water-soluble gums such as gum arabic may also be used. Polyvinyl alcohol can also be used.

Klucel, a surface-active nonionic water-soluble hydroxypropyl cellulose ether, has been found to give excellent results in the invention. It is the preferred polymer in the invention. It is prepared by reacting alkali cellulose with propylene oxide at elevated temperatures and pressure and finally purified. It is soluble in water below 40° C, but it is insoluble above that temperature. It is also soluble in polar organic solvents either hot or cold. Propylene glycol, ethyl alcohol, dioxane, cellosolve and methyl alcohol are good solvents for hydroxypropyl cellulose. Klucel is available in several viscosity types and is compatible with most common inorganic salts at low salt concentration and with most natural gums and synthetic water-soluble polymers. Solutions are generally stable in the pH range of 3–10. Some specific properties are shown below.

KLUCEL POLYMER

Appearance — off-white, odorless, tasteless powder
Solubility — soluble in water below 40° C soluble in polar solvents (hot or cold) soluble in water-polar solvent blends
Bulk Density, g./ml. — approximately 0.5
Softening Temperature — 130° C

KLUCEL SOLUTIONS IN WATER

Specific Gravity, 2% sol. at 30° C — 1.010
Refractive Index, 2% sol. — 1.337
Surface Tension, 0.1% sol. dynes/cm. — 44.6
Bulking Value in sol., gal./lb. — 0.04

KLUCEL FILMS

Specific Gravity — Approx. 1.1
Tensile Strength, psi — 2,000
Modulus of Elasticity, psi — 60,000
Elongation at Break, % — Approx. 50
Flexibility (MIT double folds, 2-mil film) —>10,000
Blocking Resistance — No Blocking at 90% RH Solvents which can be used in the practice of the present invention are those which will dissolve the cellulose binder in the desired concentration. The safest and cheapest solvent is water (softened or distilled preferred, but not required). It may be desirable to use other solvents alone or with water to obtain faster drying times. Some other suitable solvents include propylene glycol, methyl alcohol, ethyl alcohol, isopropyl alcohol, methyl cellulose, t-butanol:water (9:1), acetone:water (9:1), glycerin:water (3:7).

When desired to impart a particular color shade, a dye or pigment can be incorporated in the coating formulation. Such pigments can be any of those normally used in varnish stains, such as, for example, iron oxides, titanium dioxide, carbon black, burnt umber, Para red, Hansa yellows, phthalocyanine, and basic potassium chromate, and also mixtures of these with each other or the like. Dyes useful include Food, Drug and Cosmetic dyes and lakes, fabric dyes, any of the well known azo dyes such as methyl orange, orange 11, Fast Scarlet G, and the like, triphenylmethane dyes; isatin dyes, anthraquinone dyes and quinonimine dyes. Food dyes available commercially from Durkee Famous Foods, Cleveland, Ohio and Rit fabric dyes sold by Best Foods, Indianapolis, Ind. are also useful.

The particulate powdered metal preferably has a bulking value of 0.048 gal./lb. for aluminum and 0.015 gal./lb. for gold bronze, or copper.

The bulking value or apparent density of the metal and the viscosity of the solution can be used to define the critical limits of the proportions of particulate metal, solvent, and polymer which produces the flemish or antique appearance on a solid substrate. For example, 100 volumes of a 2% by weight solution having a viscosity of 6.2 centipoise at 25° C can be mixed with up to 15 volumes of particulate metal. The percentage by weight of the particulate metal in the mixture is dependent upon the apparent density of the particulate metal used. At the other end of the scale, up to 4 volumes of particulate metal can be added to 100 volumes of a 12% by wight solution having a viscosity of 550 centipoise at 25° C. This relationship is further illustrated in the Table below where the left-hand column is the weight per cent of cellulose polymer in water, the middle column is the viscosity of the solution in centipoises at 25° C and the right-hand column is the maximum volumes of particulate powdered metal which can be added to 100 volumes of the corresponding polymer solution in the left-hand column to give a dispersion of this invention. A straight line is obtained when the volume maxima are plotted on a linear scale and the viscosity in centipoises is plotted on a logarithmic scale.

| Cellulose Polymer, Weight Per Cent | Viscosity Centipoises at 25° C | Maximum Metal Apparent Vol. per 100 Vols. of Solution |
|---|---|---|
| 2 | 6.2 | 15 |
| 4 | 17 | 13 |
| 6 | 44 | 10 |
| 8 | 110 | 8 |
| 10 | 250 | 6 |
| 12 | 550 | 4 |

The formulations used in the practice of this invention are conveniently prepared by dissolving the desired amount of the polymeric binder in a suitable amount of solvent following which the metal powder is dispersed in the resulting solution. Alternatively, a mixture of the powdered polymeric polymer together with the metal powder can be formulated and held for subsequent addition to solvent. This latter embodiment provides one form in which to market the solids part of the composition.

The formulations used in practicing the present invention conveniently can be applied by any one of several conventional techniques such as, for example, by brush, roller, pressure or mechanical spray, dipping or in the form of an aerosol or barrier package. After the formulation is applied to the surface of the object, any excess is either shaken off or simply allowed to drain off and the object is allowed to stand for sufficient time to permit it to dry. The flemished or antiqued appearance develops immediately upon application.

The invention is further illustrated by the following examples.

In order to illustrate a specific and preferred embodiment of the invention, a solution is prepared by dissolving 10 parts by weight of Klucel hydroxypropyl cellulose in 100 parts by weight of cold water and adding 3.5 parts by weight of a Gold Bronze Powder available under the brand name "Monarch Rich Pale Gold Extra Fine MD 50". The Klucel has the properties hereinbefore recited. MD 60 is a gold bronze powder described as extra fine with 99.5% passing through a 325 mesh screen. The powder has a specific gravity of 8.0 and a bulking value of 0.015 gallon per pound.

The resulting formulation consisting of gold colored metal particles dispersed in a water solution of cellulose binder is applied to plastic artificial flowers by means of a brush. The excess coating formulation is allowed to drain off, and the coated flowers are permitted to dry at room temperature. On inspection after drying, it is observed that the objects have been covered with a film of a coating adhering firmly to their surfaces having the gold bronze metal predominately localized on hills and valleys of rough surface areas on the flowers which gives a pleasing antiqued appearance to the flowers. This antiqued appearance is considerably different than the hammered metal surface appearance which can be achieved by a spattering process with metal containing dispersions containing large quantities of dark or black pigments.

EXAMPLE 2

The formulation as prepared in Example 1 is applied by means of a hand sprayer. Plastic flowers were sprayed by first shaking the sprayer containing the dispersion, holding the nozzle 6 to 8 inches from the flowers, and spraying. The flowers upon drying were coated with a film of cellulose binder. The metallic particles had collected predominantly on the edges and valleys to give a flemished or antiqued effect.

The other Examples (3 to 14) were prepared using the cellulose polymer described in Example 1 in cold water with the powdered metal indicated according to the procedure of Example 1. The use of the compositions of Examples 3 to 14 give results similar to that in Examples 1 and 2.

Referring to the drawing, the relationship between the area below Boundary A represents the amount of cellulose polymer and metal powder in the formulation which gives this unusual effect except that when the powder is aluminum only one-third of the quantity of metal (the area below Boundary B) is used. Formula-

| Ingredients, % by Wt. | 3 | 4 | 5 | 6 | 7 | 8 | 9 | 10 | 11 | 12 | 13 | 14 |
|---|---|---|---|---|---|---|---|---|---|---|---|---|
| Binder | 2 | 5 | 2 | 5 | 2 | 5 | 2 | 10 | 2 | 10 | 12 | 10 |
| Distilled Water | 92 | 91 | 96 | 93 | 90 | 89 | 90 | 87 | 94 | 88 | 94 | 86 |
| Bronze Powder | 6 | 4 | | | 6 | 4 | 6 | 3 | | | | |
| Aluminum Powder | | | 2 | 2 | | | | | 2 | 2 | 2 | 2 |
| Red Iron Oxide Pigment | | | | | | | (2) | | | | (2) | (2) |
| Burnt Umber Pigment | | | | | (2) | (2) | | | (2) | | | |
| Black Dye | | | | | (2) | (2) | | | (2) | | | |
| Red Dye | | | | | | | (2) | | | | (2) | (2) |

( ) Either one or the other.

EXAMPLE 1

A unique feature of this invention is the use of a water-based antiquing solution. It offers the same advantages over the solvent-based antiquing solutions as provided by water-based paints over oil- or solvent-based paints.

tions having more metal powder as depicted above Boundary A do not give the antiqued effect herein described but give a continuous, metallized, paint-like finish. The formulations represented above Boundary A are prior art paints as contrasted to my novel antiquing formulations.

The coated articles of this invention including plastic artificial flowers, centerpieces, displays, dried plants, paneling and the like are useful as decorative objects and dovering materials. The coating highlights these objects and can eliminate the harsh appearance of many of these articles.

The foregoing detailed description has been given for clarity of understanding only and no unnecessary limitations are to be understood therefrom. The invention is not limited to the exact details shown and described for obvious modifications will occur to those skilled in the art.

I claim:

1. A metal dispersion useful for coating solid substrate surfaces with a flemish-like, antique finish, comprising:

a. about 0.1 to 15% by weight of water-soluble cellulose polymer selected from the group of sodium carboxymethyl cellulose, carboxymethyl hydroxyethyl cellulose, hydroxyethyl celluose and hydroxypropyl cellulose; and polyvinyl alcohol or mixtures thereof;
   b. about 0.1 to 16% by weight of a particulate metal powder selected from the group consisting of aluminum, bronze, copper, gold, silver and mixtures thereof;
   c. 0 to about 10% by weight of dye or pigment; and
   d. about 59 to 99.8% by weight of water, polar solvents or water-solvent blends.

2. A dispersion of claim 1 wherein the water-soluble cellulose polymer is hydroxypropyl cellulose and the solvent is water.

* * * * *